United States Patent [19]
Halliger et al.

[11] 3,846,034
[45] Nov. 5, 1974

[54] SYSTEM FOR SECURING A BEARING ABOUT A SHAFT

[75] Inventors: Leonhard Halliger; Horst Schröder, both of Schweinfurt, Germany

[73] Assignee: SKF Industrial Trading and Development Company B.V., Amsterdam, Netherlands

[22] Filed: Oct. 3, 1973

[21] Appl. No.: 403,331

[30] Foreign Application Priority Data
Oct. 12, 1972 Germany............................ 2249906

[52] U.S. Cl. ............................................. 403/351
[51] Int. Cl. ............................................. F16c 35/06
[58] Field of Search .......... 403/351, 352, 354, 350, 403/367; 308/236

[56] References Cited
UNITED STATES PATENTS
2,697,621 12/1954 Frederick.......................... 403/351
2,729,479 1/1956 Leister............................... 403/351
3,709,574 1/1973 Potter................................ 308/236

*Primary Examiner*—Andrew V. Kundrat
*Attorney, Agent, or Firm*—Murray Schaffer

[57] ABSTRACT

A bearing having an inner and outer ring secured to a shaft. A groove is formed on the upper surface of the inner ring and a slit is formed on the inner surface of the inner ring. The slit runs along the end of the ring tangentially to the radius of the shaft and transversely to the axis of the shaft. The shaft partially penetrates the slit. A clip has one end radially engaged in the groove and the other end extending axially within the slit.

8 Claims, 11 Drawing Figures

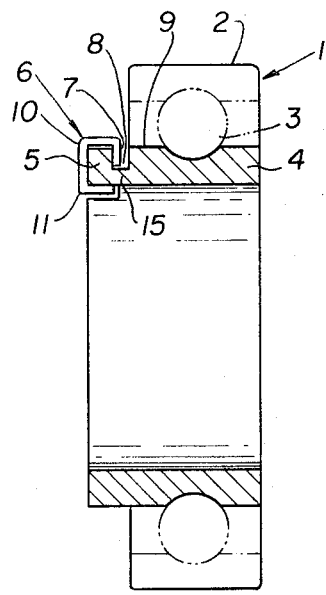
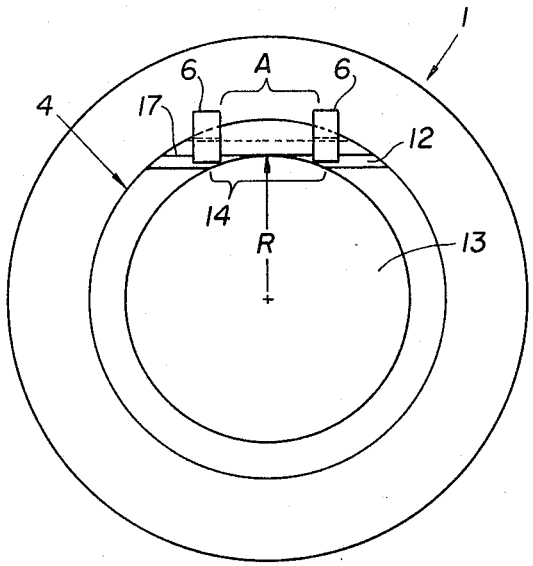
FIG.1  FIG.2
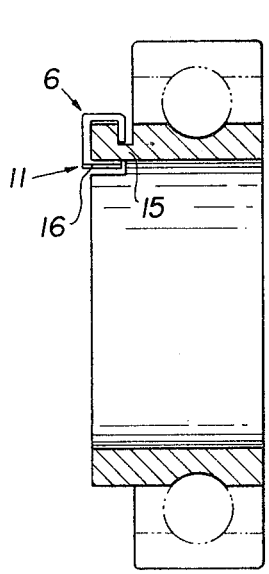
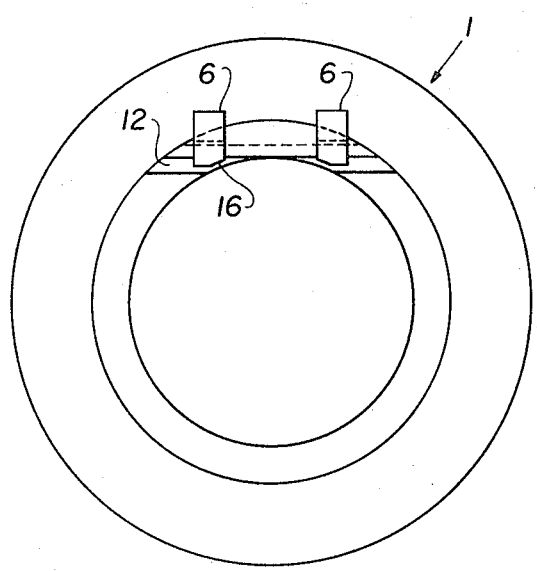
FIG.3  FIG.4

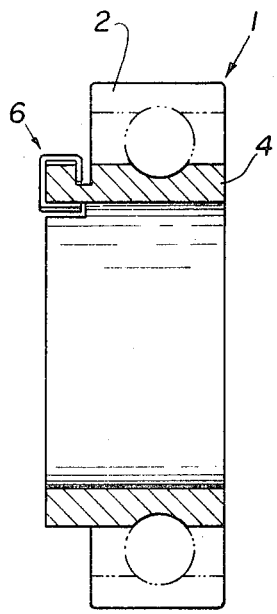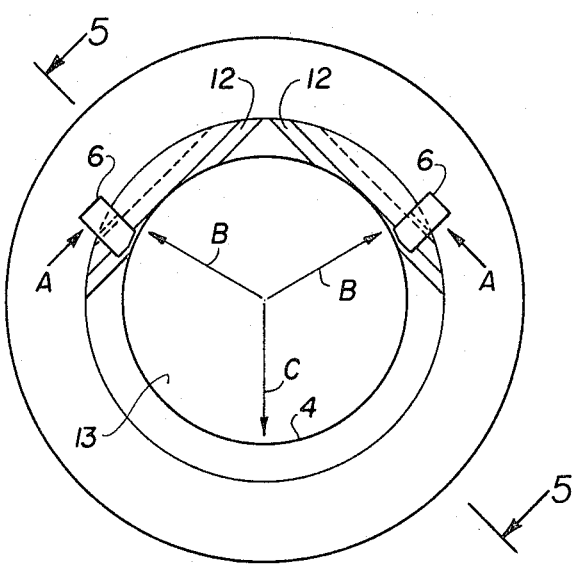
FIG.5  FIG.6
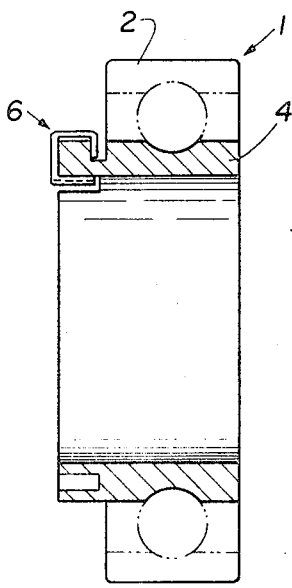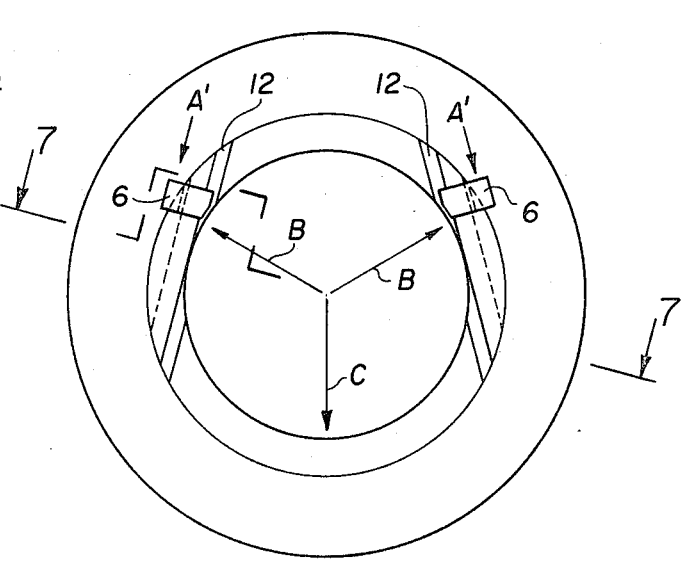
FIG.7  FIG.8

SYSTEM FOR SECURING A BEARING ABOUT A SHAFT

BACKGROUND OF INVENTION

The present invention relates to a system for fastening the inner ring of an anti-friction bearing or the like to a shaft.

Several techniques have been known to fasten the inner ring of an anti-friction bearing to the shaft mounted within it. One of these techniques calls for axially widening or enlarging one end of the inner ring and forming on the outer surface of this part a peripheral groove. The inner surface of the inner ring is formed with a cycle or crescent shaped recess which may or may not have a taper. A pair of resilient clips is provided one end of which engages within the peripheral groove, the other end of which extends in the axial direction in the crescent shaped recess. The members are assembled by slipping the inner ring onto the shaft and the two clips are driven by means of a special tube into the tapering gap formed by the cycle or crescent shaped recess and the shaft. In this manner the shaft and the inner ring are wedged and braced with one another. This system and the clips employed therein are described in U.S. Pat. Nos. 2,729,479 and 2,697,621 to which reference may be made.

It is known also from the German Pat. No. 837,791 to provide at least one bore or drilling on the side of the inner ring into which wedging or forced in pins can be inserted so as to rigidly join the inner ring to the shaft. Between the drilled bores and the end of the inner ring there must however in every case be provided a fillet so that the wedging pin is prevented from dropping out. In the event a slit is provided in accordance with the earlier arrangement, on the front end of the inner ring, there would thus be no reliable attachment of the roller bearing by means of the wedged in pins.

It is an object of the present invention to provide an improved system and means for securing the inner ring of an anti-friction bearing to a shaft or the like.

It is a further object of the present invention to provide an improved geometric design which permits the reliable bracing of the shaft and the inner ring together by means of removable and adjustable clips.

It is a further object of the present invention to provide a system and means for fastening the inner ring of an anti-friction bearing in the shaft which is simple both in the manufacture and formation of the shaft and bearings and at the same time is economical to make and to use.

These objects, other objects, as well as numerous advantages will be apparent from a reading of the following description of the preferred embodiments of the invention.

SUMMARY OF THE INVENTION

According to the present invention a system for securing the inner ring of an anti-friction bearing or the like on the shaft is provided. The system comprises forming a groove on the upper surface of the inner ring adjacent one end thereof and a slit on the inner surface of the inner ring in opposition to the groove. The slit is formed to run along the end of the inner ring tangentially to the radius of the shaft held in the bearing and being partially penetrated or open to the shaft. A clip is provided having one end radially engaged in the groove and its other end extending axially within the slit. The clip is slidable within the groove to removably wedge between the inner ring and the shaft.

The tangential slit is flat and thus has the advantage that it can be made at extremely low cost and without major outlay in tools or machines. One or more slits are provided, which advantageously divides the inner ring into several secant sections which allow for a resilient action in the separate parts of the inner ring to contribute to the bracing of the shaft.

A particularly advantageous form of the invention is characterized in providing a pair of clips, one each being inserted within the groove and slit on either side of the shaft. The two clips are forced together toward each other, thus bracing the shaft at two points and forcing its opposite end, in a resultant vector into engagement with the inner ring. A single groove and slit arrangement can be provided and the two clips run in the same flat slit. In this manner they can be forced toward each other by the use of a simple pair of pliers so as to reliably brace the shaft. There is a causal connection between the spaced apart clips and the bracing force applied which can be determined as the distance between the clips. This distance may be predetermined. Thus, after measuring the distance between the two clips by a ruler or a caliper, it is easy to check whether the bracing force is sufficient for the given application. Thereafter, adjustment may be made.

It is furthermore of advantage to form the slit in the manner of a pocket extending opening from the edge of the inner ring and having a bridge portion between the outer surface of the ring and its inner surface at each of the pocket ends. In this way the clips although slidable cannot fall out of the slit before they are assembled with the shaft or even during dismantling.

According to a further advantageous form of the present invention the edge portion of the clip extending in the axial direction between the inner ring and the shaft is beveled at least on one side. In this way the frictional condition and the self-retaining effect between the clips, shaft and the surface of the slit in the inner ring is greatly improved. By further beveling both of the opposite edges of the clip, it is possible to drive the clip into engagement from either side. According to the present invention it is preferable that the groove formed on the outer surface of the inner ring runs parallel to the slit and straight across the inner ring. The groove can be made by sawing or milling or by any other simple and economical means. The groove may be circular or concave.

Preferably, the slit in the inner surface of the ring is formed with an upper edge which defines the tangential relationship with the shaft. Preferably, this upper edge is slightly spaced from the edge of the shaft to permit the clips to enter in secure wedge-like fashion therebetween. The slit is of such a depth or height that the shaft cuts into the slit through its bottom edge, thus forming the partial opening for the shaft.

Full details of the present invention are given in the following disclosure and are shown in the accompanying drawings.

BRIEF DESCRIPTION OF THE DRAWINGS

In the drawings:

FIG. 1 is a section through an anti-friction bearing showing one form of the present invention, FIG. 2 is an end view of the bearing shown in FIG. 1, FIGS. 3 and 4 are views similar to FIGS. 1 and 2 showing a second form of the present invention wherein the clips are beveled, FIGS. 5 and 6 show still another form of the present invention having a pair of slits and grooves, in views similar to FIGS. 1 and 2.

FIGS. 7 and 8 are modifications of a form of the invention shown in FIGS. 5 and 6, FIGS. 9 and 10 show additional forms of the present invention wherein the groove and slits are formed to prevent the clips from falling out.

DESCRIPTION OF THE INVENTION

Figure 11:
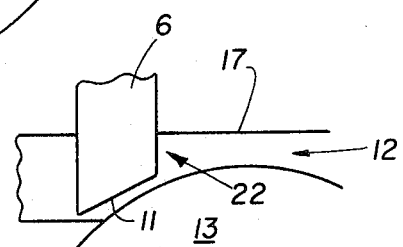
FIG. 11 is an enlarged partial view of the slit of the present invention in another form.

The anti-friction bearing generally depicted by the numeral 1, as seen in FIG. 1 comprises an outer ring 2, a plurality of roller elements 3 and an inner ring 4 arranged in conventional manner. The inner ring 4 is axially extended or widened at one end 5 and is provided with one or more clips 6. One end 7 of the clip 6 extends in a radial direction within a groove 8 cut transversely in the upper or outer surface 9 of the inner ring. The clip 6 is bent in a substantially rectangular shape and extends over the end 10 of the extended portion 5 of the inner ring so that its other end 11 extends in an axial direction flush with the inner surface of the inner ring 4. The end 11 extends in a slit 12, clearly seen in FIG. 2. The slit 12 extends from the end of the inner ring 4 axially inward and runs transversely in a tangential direction to the radius R of the shaft 13 so as to intersect the shaft. The shaft 13 penetrates or cuts into the slot 12 in a central zone indicated by the numeral 14. At most the upper edge 17 of the slot 12 will engage the shaft 13 tangentially. It is not necessary that this upper edge touch the shaft and in many instances it may be preferred that it be spaced therefrom as is shown in FIG. 11. The clip 6 is preferably made of resilient material such as spring metal and the like and grasps the extended end 5 of the inner ring 4 so tightly that after it is placed in position it will remain there without dislodgement.

In the form seen in FIGS. 1 and 2 the clips 6 are slidable in the parallel groove 8 and slit 12. In order to brace or wedge the shaft securely within the inner ring, the clips 6 are moved toward one another by means of the use of a simple tool such as a pair of pliers. In this way the end 11 wedges between the shaft 13 and the surface of the inner ring thus holding the two together. The distance A between the clips 6, when the clips are placed in their optimum wedging position can be easily measured. This distance A is a guage of the bracing force necessarily applied in order to secure the shaft 13 securely in the inner ring 4. Should it be required that this distance be maintained extremely accurately, a shim or template can be preformed at this accurate distance. The template can be held between the two clips before the two clips are compressed together. The clips 6 when compressed with the pliers to the distance determined by the template A can be assumed to be at their perfect position. After this operation the template can be removed.

In the form of the invention shown in FIGS. 1 and 2 it is preferable that the groove 8 cut within the upper surface of the inner ring runs parallel to the slit 12 formed on the undersurface so that the distance 15 between them has everywhere the same wall thickness.

The embodiment shown in FIGS. 3 and 4 is basically similar to that shown in FIG. 1 except that where the end 11 of the clip 6 would engage or wedge between the shaft and the inner ring, the edge is beveled as indicated by the numeral 16. This oblique beveling surface 16 provides an angular shape to the clip which permits the clip to be further inserted and wedged between the shaft and the inner ring in such a way that the greatest degree of self-retention and wedging force is obtained.

In the embodiment of FIGS. 5 and 6, wherein the bearing 1 is basically the same, there are provided a pair of cooperating and corresponding slits 12 and grooves 8 on the inner ring. Each one of the pair of grooves and slits are set at an angle to each other but otherwise maintain the same relationship to each other and to the center of the shaft 13 as described in FIG. 1. In each of the grooves and slits there is a clip 6 which braces the shaft 13 with respect to the inner ring 4. The clips 6 are moved toward one another in the direction of the arrows A so as to apply a radially inward wedging force in opposition to the arrows B. This wedging force acts in a resultant manner in the direction of arrow C which provides a third point of wedging contact between the shaft 13 and the inner ring 4. In the embodiment of FIGS. 7 and 8 a similar pair of slits and grooves are provided except that here the slits and grooves are at a greater angle to each other. Each of the slits and grooves is also provided with a clip 6 which in this instance is wedged in the direction of arrow A'. This also produces a three point fastening contact denoted by the arrows. The clips may be provided with their beveled edges or not as desired.

Figure 9:
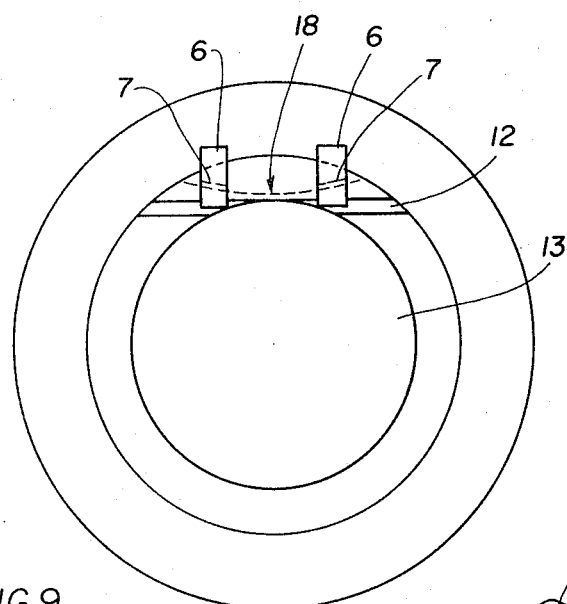

In FIG. 9 the groove 18 is provided which corresponds to the groove 8 as shown previously in FIG. 1. The groove 18 however has a concave shape with respect to the slit 12. In this way the clips 6 once they have been sprung into the groove 18 and the corresponding slit 12 cannot be inadvertently lost or dislodged. This affords great advantage in the assembly and transport as well as storage of the bearing and its subsequent assembly on the shaft. The radially depending ends 7 of the clips are arcuately formed to conform to the concave curvature of the groove 18 and thus are given an oblique or convex shape. The system in assembly is otherwise the same as that described earlier.

Figure 10:
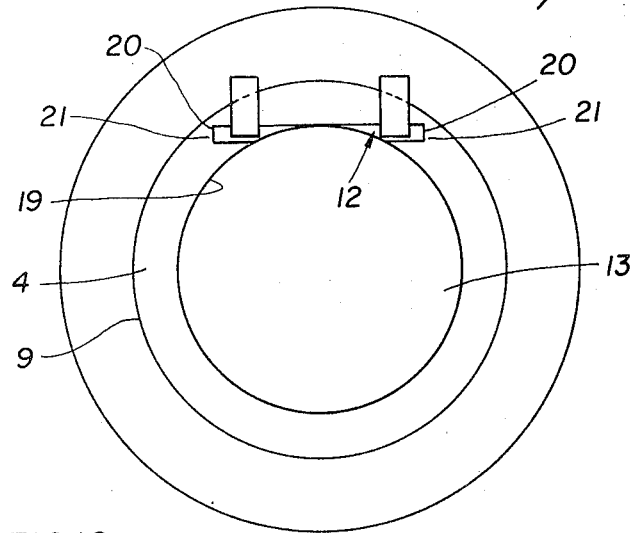

In FIG. 10 the slit 12 is made in the form of a pocket. It starts from a hole or drilling 19 axially inwardly from the edge of the inner ring 4 and terminates in a pair of closed ends 20. Between the end 20 and the outer surface 9 of the inner ring 4, a bridge 21 is formed. Before assembly, the clips 6 are inserted in the pocket shaped part of the slit 12 and after fitting the shaft within the inner rings the clips are moved toward one another into wedging engagement between the inner ring and the shaft 13. In this manner the clips 6 are again unloosable nor do they impede or damage the shaft when the shaft is placed in the opening or bore 19. The inner ring is scarcely weakened because the bridge 21 acts as a reinforcing member.

FIG. 11 shows an enlarged view of the preferred form of the assembly wherein the slit 12 is formed so that the shaft does not touch the upper or outer edge 17 of the slit. In this way the clip 6 can be driven further inwardly toward the middle of the slit and provide a more secure and forceful wedging action. FIG. 11 again shows the possibility of forming a beveled edge 11 on the clip 6. The shape of the end 11 of the slit depends on the geometry of the gap 22 formed between the slit and the shaft and the frictional wedging conditions desired. The gap 22 can be dimensioned in such a way that the two clips 6 as used in FIG. 1, etc., come into contact with one another when the shaft 13 is fastened. Thus the use of a template is not necessary.

While the present invention has been described as means for fastening the inner ring of a roller bearing assembly to a shaft the same may be used for fastening hubs, or sleeves on shafts that transmit only very low torque. In such instances only a single clip 6 need be driven into the slit 12. While in the embodiments the slit 12 is shown as extending transversely across the end of the inner ring as a chordal member, when only one clip is used the slit 12 may be shortened and that part or portion not necessary can be dispensed with. It is possible also to employ the present invention to attach other cylindrical or partially cylindrical machine components on shafts or axles, all within the scope of the present invention.

Various modifications, changes and embodiments have been described herein. Others will be obvious to those skilled in the present art. Accordingly, it is intended that the present disclosure be taken as illustrative only of the present invention and not as limiting of it.

What is claimed is:

1. A system for securing the inner ring of an anti-friction bearing or the like on a shaft comprising, a groove on the outer surface of said inner ring adjacent one end thereof and a slit on the inner surface of said inner ring in opposition to said groove, said slit extending axially from the end of said inner ring and tangentially to the radius of the inner ring and shaft so as to intersect said shaft, and a clip having one end radially engaged in said groove and the other end extending axially within said slit, said clip being slidable within said groove and slit to removably wedge between said inner ring and said shaft.

2. The system according to claim 1 wherein said clip is made of resilient material.

3. The system according to claim 1 including two clips, one of said clips being arranged on one side of said shaft and the other of said clips being arranged on the other side of said shaft to brace said shaft therebetween.

4. The system according to claim 1 wherein said slit is formed in the shape of a pocket having an opening at its mid-section for receipt of said shaft and being provided with bridge members at its ends between the outer and inner surfaces of said inner ring closing its ends.

5. The system according to claim 1 wherein the axial edge of said clip adjacent said shaft is beveled.

6. The system according to claim 1 wherein the groove on the outer surface of said inner ring is parallel to said slit.

7. The system according to claim 1 wherein the groove on the outer surface of said inner ring is concave with respect to said slit.

8. The system according to claim 1 where at least two pair of grooves and opposing slits are formed, each provided with at least one clip, the groove and slits of said pair being radially spaced from each other.

* * * * *